United States Patent
Yi

(10) Patent No.: US 8,788,776 B2
(45) Date of Patent: Jul. 22, 2014

(54) HARD DISK CONTROL METHOD, HARD DISK CONTROL DEVICE AND COMPUTER

(75) Inventor: Xianqun Yi, Beijing (CN)

(73) Assignees: Beijing Lenovo Software Ltd, Beijing (CN); Lenovo (Beijing) Co., Ltd., Beijing (CN)

( * ) Notice: Subject to any disclaimer, the term of this patent is extended or adjusted under 35 U.S.C. 154(b) by 61 days.

(21) Appl. No.: 13/508,151

(22) PCT Filed: Oct. 29, 2010

(86) PCT No.: PCT/CN2010/078235
§ 371 (c)(1),
(2), (4) Date: May 4, 2012

(87) PCT Pub. No.: WO2011/054271
PCT Pub. Date: May 12, 2011

(65) Prior Publication Data
US 2012/0226881 A1    Sep. 6, 2012

(30) Foreign Application Priority Data
Nov. 6, 2009    (CN) .......................... 2009 1 0237152

(51) Int. Cl.
*G06F 12/00*    (2006.01)
*G06F 1/32*    (2006.01)

(52) U.S. Cl.
CPC .............. *G06F 1/3268* (2013.01); *Y02B 60/32* (2013.01); *Y02B 60/1246* (2013.01); *G06F 1/3221* (2013.01)
USPC ........................................ 711/163; 713/324

(58) Field of Classification Search
CPC ............................ G06F 1/3221; G06F 1/3268
See application file for complete search history.

(56) References Cited

U.S. PATENT DOCUMENTS

| 5,954,820 A * | 9/1999 | Hetzler ........................ 713/323 |
| 2004/0246855 A1 | 12/2004 | Kobayashi |
| 2005/0160221 A1* | 7/2005 | Yamazaki et al. ............. 711/114 |
| 2007/0002485 A1* | 1/2007 | Jun ................................ 360/75 |

FOREIGN PATENT DOCUMENTS

| CN | 101192093 | 6/2008 |
| CN | 101262580 | 9/2008 |
| CN | 101364138 | 2/2009 |
| JP | 2006302366 A | 11/2006 |

OTHER PUBLICATIONS

PCT/CN2010/078235 International Search Report dated Jan. 10, 2011 (2 pages).
PCT/CN2010/078235 International Preliminary Report on Patentability dated May 8, 2012 (5 pages).

* cited by examiner

*Primary Examiner* — Hiep Nguyen
(74) *Attorney, Agent, or Firm* — Brinks Gilson & Lione; G. Peter Nichols

(57) ABSTRACT

A hard disk control method, a hard disk control device and a computer are provided The method includes detecting the current mode in which the system runs; determining the access frequency of the hard disk in the system when detecting the system runs in an idle mode currently; intercepting the hard disk access commands to be sent to the hard disk when the access frequency of the hard disk is lower than a predetermined access frequency threshold to make the hard disk enter into a preset power saving mode, and saving the hard disk access commands into a preset memory.

11 Claims, 1 Drawing Sheet

HARD DISK CONTROL METHOD, HARD DISK CONTROL DEVICE AND COMPUTER

BACKGROUND

The invention relates to computer field, and in particularly, to a method, apparatus and computer for Controlling a Hard Disk.

In order to save power, electronic devices such as computers have a plurality of power saving modes. For example, the power saving modes of the existing notebook computers include: Idle Mode, Standby Mode, Suspend Mode and so on. When the hard disk is in different modes, the power consumptions are significantly different. For example, the power consumption when the hard disk operates in the standby mode is significantly lower than the power consumption when the hard disk operates in the idle mode.

In practical use, a user can make a hard disk enter a power saving standby mode by configuring the hard disk to be off. However, in realizing the invention, the inventor found there are at least the following problem in the prior art: in the practical use, even if the user configures the hard disk to be off, due to periodical accesses on the hard disk by an operating system, the hard disk is basically always in an accessed state, so that basically, a non-operative state of the hard disk can not be realized, and it is hard to make the hard disk really enter some predetermined power saving modes, such as the standby mode.

SUMMARY

An embodiment of the invention provides a method, apparatus and computer for controlling a hard disk, to make the hard disk realize a non-operative state and enter a predetermined power saving mode.

In order to realize the above objects, in an aspect, it is provided a method for controlling a hard disk, comprising the following steps:

detecting a mode in which a system currently is;

when it is detected that the system is currently in an idle mode, determining the access frequency of the hard disk in the system;

when the access frequency of the hard disk is less than a predetermined access frequency threshold, blocking a hard disk access command to be sent to said hard disk, to make the hard disk enter a predetermined power saving mode, and save said hard disk access command into a predetermined memory.

Preferably, said method for controlling a hard disk determines the access frequency of the hard disk of the system by collecting an input/output speed of said hard disk.

Preferably, said method for controlling a hard disk further includes, after said blocking:

when it is detected that a predetermined trigger event for terminating the blocking occurs, terminating the blocking, and sending the access command already saved in the memory to said hard disk.

Preferably, in said method for controlling a hard disk, said power saving mode is a standby mode.

Preferably, said method for controlling a hard disk further includes, after said blocking:

when the time length for maintaining the blocking reaches a time length set by a user in advance, making said hard disk enter the predetermined power saving model; or sending a command for entering the power saving mode to the hard disk, and notifying said hard disk to enter said predetermined power saving mode.

In another aspect, it is provided an apparatus for controlling a hard disk, comprising:

a mode detecting module, configured to detect a mode in which a system currently is;

an access frequency determining module, configured to when it is detected that the system is currently in an idle mode, determine the access frequency of the hard disk in the system;

a blocking module, configured to when the access frequency of the hard disk is less than a predetermined access frequency threshold, block a hard disk access command to be sent to said hard disk, to make the hard disk enter a predetermined power saving mode, and save said hard disk access command into a, predetermined memory.

Preferably, in said apparatus for controlling a hard disk, said access frequency determining module determines the access frequency of the hard disk of the system by collecting an input/output speed of said hard disk.

Preferably, said apparatus for controlling a hard disk further includes:

a blocking terminating module, configured to when it is detected that a trigger event for terminating the blocking occurs, terminate the blocking, and send the access command already saved in the memory to said hard disk.

Preferably, said apparatus for controlling a hard disk further includes:

a standby mode entering module, configured to after said blocking, make the hard disk enter a standby mode.

In another aspect, it is provided a computer, including a hard disk, further comprising: a hard disk controlling means, wherein, said hard disk controlling means including:

a mode detecting module, configured to detect a mode in which a system currently is;

an access frequency determining module, configured to when it is detected that the system is currently in an idle mode, determine the access frequency of the hard disk in the system;

a blocking module, configured to when the access frequency of the hard disk is less than a predetermined access frequency threshold, block a hard disk access command to be sent to said hard disk, to make the hard disk enter a predetermined power saving mode, and save said hard disk access command into a predetermined memory.

Preferably, in the computer, said hard disk controlling means further includes:

a blocking terminating module, configured to when it is detected that a trigger event for terminating the blocking occurs, terminate the blocking, and send the access command already saved in the memory to said hard disk.

One of the above technical solutions has the following technical effect:

By blocking the access commands on the hard disk in the case that the system is in the idle mode and the access frequency of the hard disk is lower, a non-operative state of the hard disk can be realized, thereby the hard disk really entering the power saving mode or other predetermined power saving modes, to save the power.

DETAILED DESCRIPTION

In order to make the technical problems, the technical solution and the advantages of the embodiments of the invention clearer, a detailed description will be made in connection with the drawings and the specific embodiments.

Figure 1:
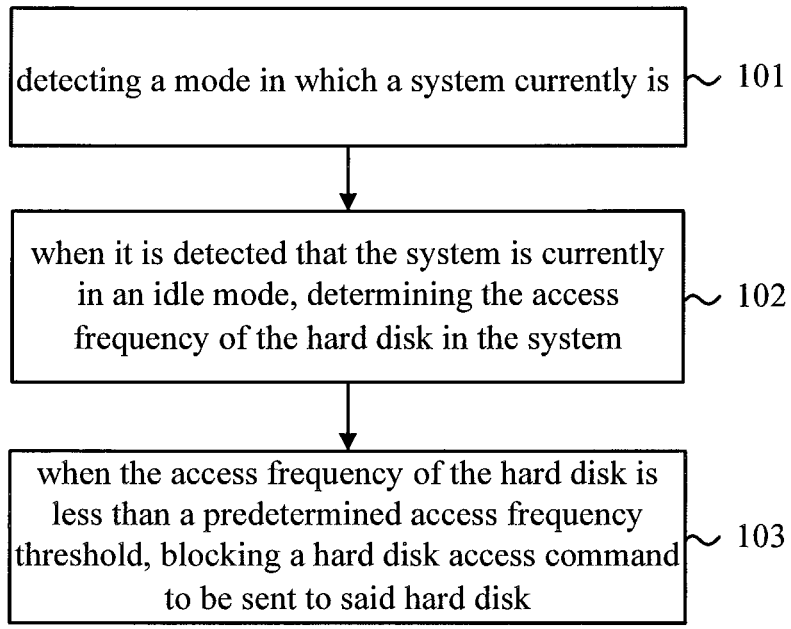
FIG. 1 is a flowchart schematic diagram of a method for controlling the hard disk according to an embodiment of the invention.

FIG. 1 is a flowchart schematic diagram of an method for controlling the hard disk according to an embodiment of the invention. As shown in FIG. 1, the method for controlling the hard disk of the embodiment of the invention includes the following steps:

Step 101, detecting a mode in which a system currently is;

Step 102, when it is detected that the system is currently in an idle mode, determining the access frequency of the hard disk in the system.

In the step, preferably, the access frequency of the hard disk in the system is determined by collecting an input/output speed of said hard disk;

Step 103, when the access frequency of the hard disk is less than a predetermined access frequency threshold, blocking a hard disk access command to be sent to said hard disk, to make the hard disk enter a predetermined power saving mode, and save said hard disk access command into a predetermined memory.

In the step, illustratively, said predetermined power saving mode is a standby mode.

In the step, preferably, when the input/output speed of the hard disk is less than a predetermined input/output speed threshold, it can be determined that the access frequency of the hard disk is less than the predetermined access frequency threshold.

In the step, preferably, the blocking all the hard disk access commands to be sent to the hard disk driver module can be realized by mounting a blocking module above the hard disk driver module such as driving program, without sending these hard disk access commands to the hard disk, thereby avoiding the operation of the hard disk to maintain the hard disk in a non-operative state, until a blocking terminating trigger event for terminating the blocking such as a user operation event or a power management event occurs, terminating the blocking, and sending the hard disk access command already saved in the memory to said hard disk.

In the step, said memory is an internal memory.

Preferably, in the embodiment, after said blocking, the hard disk enters a standby mode or other predetermined modes. In the power saving mode, according to different specific power saving modes, the rotation speed of the hard disk slows down, or the hard disk does not work at all, i.e., the hard disk is off. For example, when the hard disk is in the standby mode, the hard disk stops working, and at this point, the power consumption of the hard disk is the lowest. The hard disk stopping working includes the spindle motor of the hard disk stopping working.

Preferably, in the embodiment, the method further includes after performing said blocking, detecting if a blocking terminating trigger event occurs; if so, stopping said blocking, and sending the access command already saved in said memory to said hard disk. At this time, when there is an access command for the hard disk, the power saving mode is automatically switched to an operating mode. Meanwhile, the system can continue to execute the previous operations. Taking the above example as an example, when a user is editing a word document with an input device (keyboard), and then the user leaves due to something, now the system is in the idle state, and the access frequency of the hard disk in the system is less than the predetermined access frequency threshold, the system blocks all the hard disk access commands to be sent to the hard disk, and saves them into the predetermined memory, meanwhile the hard disk enters the power saving mode. The memory is different from the hard disk. The memory may be a flash memory. At this time, if the user returns to the computer, he/she can continue to edit the word document with the input device. When the computer detects that there is a keyboard input, the blocking event terminates. Since all the hard disk access commands to be sent to the hard disk are saved in the predetermined memory, the blocked hard disk access commands to be sent to the hard disk will not be lost, and will continue to be sent to the hard disk after the blocking event terminates. Thus, the system can still continue the previous operation, and there will not be system error, so as to improve the user's experience.

Preferably, after said blocking, maybe before or after saving the hard disk access commands, the method further includes: when the time length for maintaining the blocking reaches a time length set by a user in advance, making said hard disk enter the predetermined power saving mode. In particular, the user can set the hard disk to maintain the non-operative state in advance, that is, after the state of no access command stays for the predetermined time length, the hard disk enter the predetermined power saving mode such as the standby mode. Illustratively, the user can set the time length with BIOS, or set it with the power option setting interface provided by the operating system.

Preferably, after said blocking, maybe before or after saving the hard disk access commands, the method further includes: sending a command for entering the power saving mode to the hard disk, and notifying said hard disk to enter said predetermined power saving mode. Illustratively, the command can be sent, immediately after said blocking, to notify the hard disk to enter the predetermined power saving mode; or the command can be sent after the blocking continues for a predetermined time length, to notify the hard disk to enter the predetermined power saving mode. The sent command can notify the hard disk to enter the power saving mode immediately or after a predetermined time length.

In the embodiment, illustratively, the idle mode in which the system is means the state in which the system is when there is no interactive operation between the user and the system; for example, when the user is inputting words with the Word software, if at this time the user does not perform any input (interactive operation) with any input device due to some temporary thing, the system is currently in the idle mode.

The person skilled in the art can understand, all or part of the steps for realizing the above facts can be implemented by a program to instruct related hardwares, and said program can be stored in a computer readable storage medium, and said program when being executed includes the following steps: detecting a mode in which a system currently is; when it is detected that the system is currently in an idle mode, determining the access frequency of the hard disk in the system; when the access frequency of the hard disk is less than a predetermined access frequency threshold, blocking a hard disk access command to be sent to said hard disk, to make the hard disk enter a predetermined power saving mode, and save said hard disk access command into a predetermined memory. Said storage medium includes for example, ROM/RAM, magnetic disk, optical disc and so on.

Figure 2:
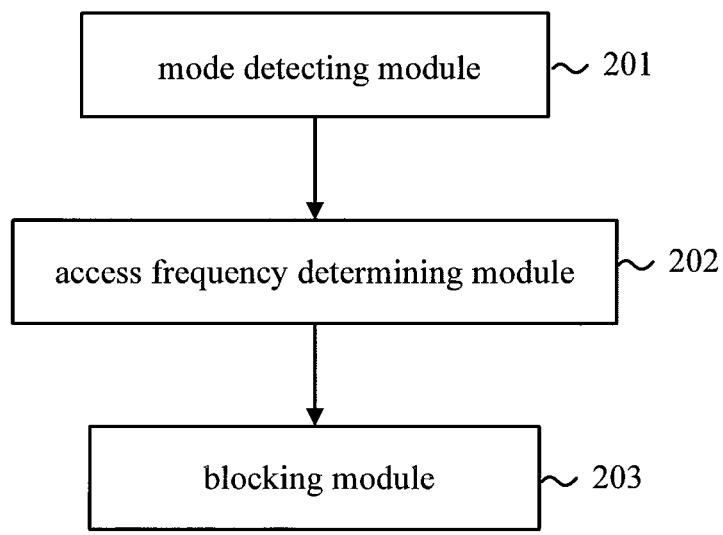
FIG. 2 is a structural schematic diagram of an apparatus for controlling the hard disk according to an embodiment of the invention.

In another aspect, an embodiment of the invention provides an apparatus for controlling a hard disk. FIG. 2 is a structural schematic diagram of an apparatus for controlling the hard disk according to an embodiment of the invention. In the FIG. 2, the apparatus for controlling the hard disk of the embodiment includes: a mode detecting module 201, configured to detect a mode in which a system currently is; an access frequency determining module 202, configured to when it is detected that the system is currently in an idle mode, determine the access frequency of the hard disk in the system; a blocking module 203, configured to when the access frequency of the hard disk is less than a predetermined access frequency threshold, block a hard disk access command to be sent to said hard disk, to make the hard disk enter a predetermined power saving mode, and save said hard disk access command into a predetermined memory.

Preferably, in said apparatus for controlling a hard disk, said access frequency determining module determines the access frequency of the hard disk of the system by collecting an input/output speed of said hard disk.

Preferably, the apparatus for controlling a hard disk further includes:

a blocking terminating module, configured to when it is detected that a trigger event for terminating the blocking occurs, terminate the blocking, and send the access command already saved in the memory to said hard disk.

Preferably, the apparatus for controlling a hard disk further includes:

a standby mode entering module, configured to after said blocking, make the hard disk enter a standby mode or other predetermined power saving modes.

The person skilled in the art can understand, all or part of the modules in said apparatus for controlling a disk hard can be implemented by hardwares such as processors, microprocessors, DSPs and so on based on programs or firmwares, and said program can be stored in a computer readable storage medium, and said firmware can be solidified in said hard disk.

In another aspect, an embodiment of the invention provides a computer including said apparatus for controlling a disk hard.

Preferably, the computer of the embodiment of the invention includes: a mode detecting module, configured to detect a mode in which a system currently is; an access frequency determining module, configured to when it is detected that the system is currently in an idle mode, determine the access frequency of the hard disk in the system; a blocking module, configured to when the access frequency of the hard disk is less than a predetermined access frequency threshold, block a hard disk access command to be sent to said hard disk, to make the hard disk enter a predetermined power saving mode, and save said hard disk access command into a predetermined memory.

The apparatus for controlling a disk hard can be integrated on the mainboard of the computer.

Preferably, in said computer, said apparatus for controlling a disk hard further includes:

a blocking terminating module, configured to when it is detected that a trigger event for terminating the blocking occurs, terminate the blocking, and send the access command already saved in the memory to said hard disk.

Preferably, in said computer, the apparatus for controlling a disk hard further includes:

a standby mode entering module, configured to after said blocking, make the hard disk enter a standby mode or other predetermined power saving modes.

Preferably, the computer of the embodiment of the invention is a notebook computer.

The above description is preferred embodiments of the invention, it should be noted that for the person skilled in the art, without departing from the spirit of the embodiments of the invention, several improvements and modifications can be made which should be considered within the protection scope of the invention.

What is claimed is:

1. A method for controlling a hard disk, comprising the steps of:

detecting a mode in which a system currently is;

when it is detected that the system is currently in an idle mode, determining the access frequency of the hard disk in the system;

when the access frequency of the hard disk is less than a predetermined access frequency threshold, blocking a hard disk access command to be sent to said hard disk, to make the hard disk enter a predetermined power saving mode, and save said hard disk access command into a predetermined memory.

2. The method for controlling a hard disk according to claim 1, wherein, the access frequency of the hard disk in the system is determined by collecting an input/output speed of said hard disk.

3. The method for controlling a hard disk according to claim 1, further comprising, after performing the blocking:

when it is detected that a predetermined trigger event for terminating the blocking occurs, terminating the blocking, and sending the access command already saved in the memory to said hard disk.

4. The method for controlling a hard disk according to claim 3, wherein, said power saving mode is a standby mode.

5. The method for controlling a hard disk according to claim 1, further comprising, after performing the blocking:

when the time length for maintaining the blocking reaches a time length set by a user in advance, making said hard disk enter the predetermined power saving mode; or sending a command for entering the power saving mode to the hard disk, and notifying said hard disk to enter said predetermined power saving mode.

6. An apparatus for controlling a hard disk, comprising:

a mode detecting module, configured to detect a mode in which a system currently is;

an access frequency determining module, configured to when it is detected that the system is currently in an idle mode, determine the access frequency of the hard disk in the system;

a blocking module, configured to when the access frequency of the hard disk is less than a predetermined access frequency threshold, block a hard disk access command to be sent to said hard disk, to make the hard disk enter a predetermined power saving mode, and save said hard disk access command into a predetermined memory.

7. The apparatus for controlling a hard disk according to claim 6, wherein, said access frequency determining module determines the access frequency of the hard disk of the system by collecting an input/output speed of said hard disk.

8. The apparatus for controlling a hard disk according to claim 6, further comprising:

a blocking terminating module, configured to when it is detected that a trigger event for terminating the blocking occurs, terminate the blocking, and send the access command already saved in the memory to said hard disk.

9. The apparatus for controlling a hard disk according to claim 8, further comprising:

a standby mode entering module, configured to after said blocking, make the hard disk enter a standby mode.

10. A computer including a hard disk, further comprising: a hard disk controlling means, wherein, said hard disk controlling means including:

a mode detecting module, configured to detect a mode in which a system currently is;

an access frequency determining module, configured to when it is detected that the system is currently in an idle mode, determine the access frequency of the hard disk in the system;

a blocking module, configured to when the access frequency of the hard disk is less than a predetermined access frequency threshold, block a hard disk access command to be sent to said hard disk, to make the hard disk enter a predetermined power saving mode, and save said hard disk access command into a predetermined memory.

11. The computer according to claim 10, wherein, said hard disk controlling means further includes:

a blocking terminating module, configured to when it is detected that a trigger event for terminating the blocking occurs, terminate the blocking, and send the access command already saved in the memory to said hard disk.

\* \* \* \* \*